Figure 1:
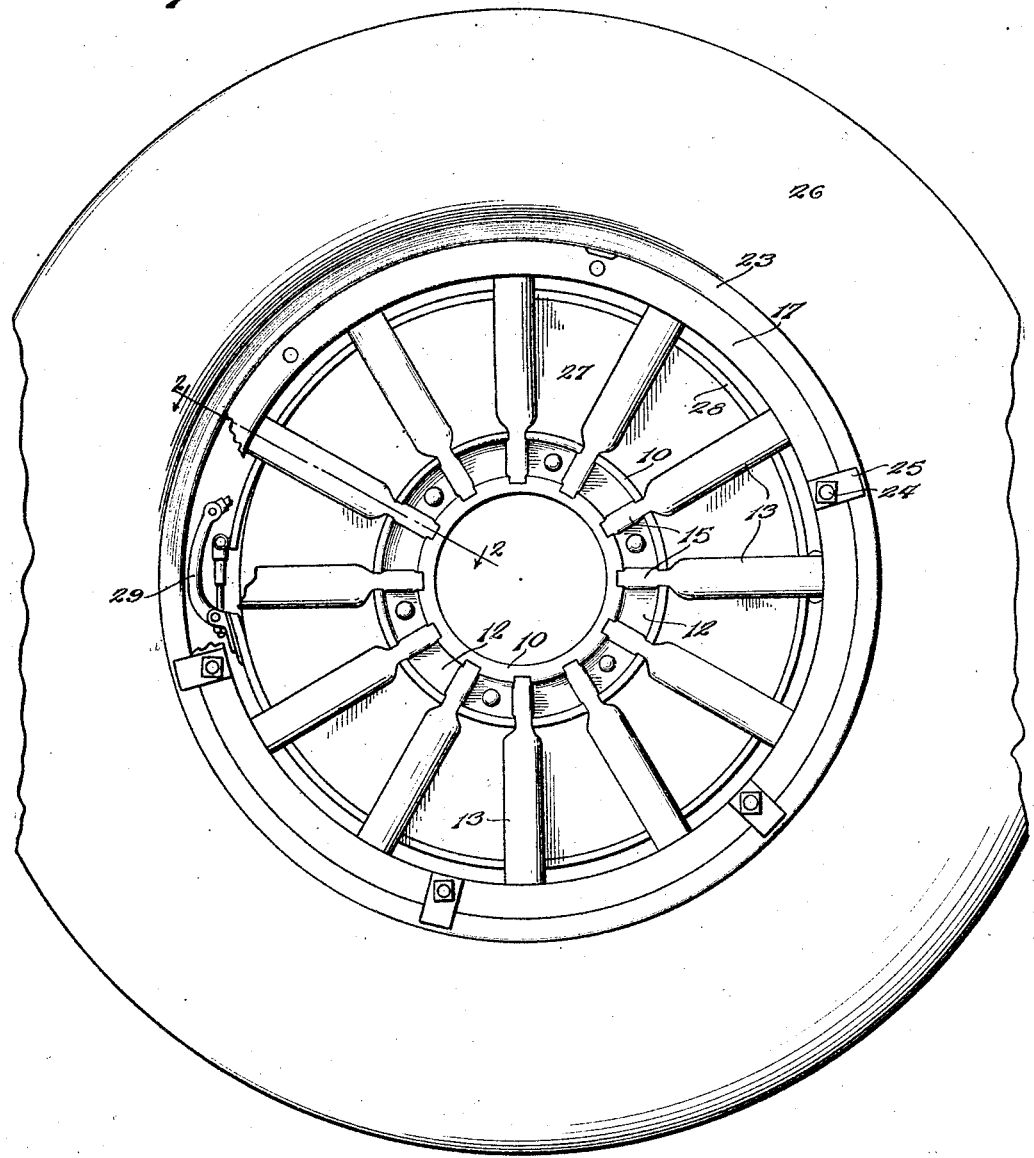

Aug. 11, 1925.

F. L. MINNICK

VEHICLE WHEEL

Filed July 3, 1924

1,549,370

2 Sheets-Sheet 1

Inventor

F. L. Minnick

By Lacy & Lacy, Attorneys

Aug. 11, 1925.
F. L. MINNICK
VEHICLE WHEEL
Filed July 3, 1924
1,549,370
2 Sheets-Sheet 2
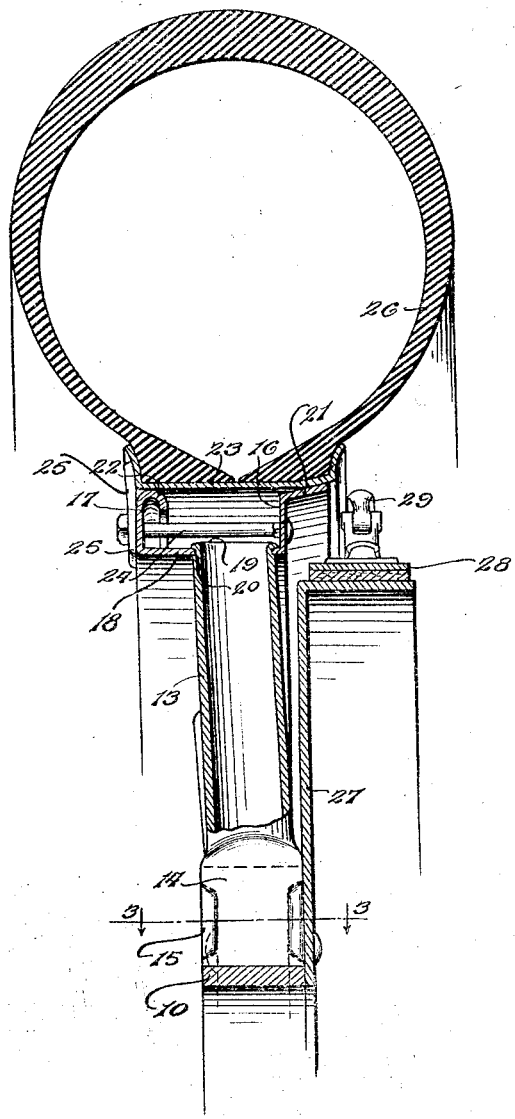
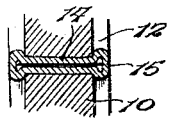
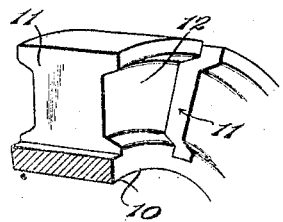
Inventor
F. L. Minnick.
By Lacey & Lacey, Attorneys Patented Aug. 11, 1925.

1,549,370

UNITED STATES PATENT OFFICE.

FREDERICK L. MINNICK, OF SEATTLE, WASHINGTON, ASSIGNOR, BY DIRECT AND MESNE ASSIGNMENTS, TO DEAN-MINNICK STEEL WHEEL COMPANY, OF SEATTLE, WASHINGTON, A CORPORATION.

VEHICLE WHEEL.

Application filed July 3, 1924. Serial No. 724,134.

*To all whom it may concern:*

Be it known that I, FREDERICK L. MINNICK, a citizen of the United States, residing at Seattle, in the county of King and State of Washington, have invented certain new and useful Improvements in Vehicle Wheels, of which the following is a specification.

This invention relates to an improved metal vehicle wheel of the general character shown in my copending application filed May 6, 1924, Serial No. 711,427, and seeks, among other objects, to provide a wheel of the construction indicated especially adapted for use in conjunction with balloon tires.

The invention seeks, as a further object, to provide a wheel wherein the spokes will be bent or deflected in such manner that the wheel will be dished.

And the invention seeks, as a still further object, to provide an improved connection between the wheel hub and spokes.

Other and incidental objects will appear hereinafter.

In the drawings:

Figure 1 is a side elevation of my improved wheel, illustrating the wheel in conjunction with a conventional brake drum and band and also illustrating a conventional balloon tire upon the wheel, Figure 2 is an enlarged sectional view on the line 2—2 of Figure 1, looking in the direction indicated by the arrows, Figure 3 is a detail sectional view on the line 3—3 of Figure 2, looking in the direction indicated by the arrows, and Figure 4 is a fragmentary perspective view of the wheel hub.

As is well known, the generally termed balloon tire as now offered on the market is of large internal diameter and it is accordingly found necessary, in order that a vehicle may be equipped with such tires, to reduce the diameter of the wheels proportionately in order that the proper clearance may be had between the tires of the wheels and the wheel fenders. However, it has been found impracticable to reduce the diameter of the vehicle brake drums which are carried by the wheels and accordingly, a situation is presented wherein, by reason of the reduction in the diameter of the wheels, the peripheries of the drums closely approach the outer periphery of the wheel fellies with the result that when the wheel rims are applied, the operating levers of the brake bands which surround the drums often strike the rims. The present invention, therefore, seeks to overcome this difficulty by dishing the wheel outwardly as well as by mounting the wheel felly in laterally displaced relation with respect to the outer ends of the spokes so that when the rim is applied to the wheel, ample clearance will be provided between the rim and the operating lever of the brake band.

As previously intimated, the wheel of the present invention is constructed entirely of metal and in carrying the invention into effect, I employ an annular hub 10 which is provided with a plurality of radial slots 11 and formed in the opposite side faces of the hub are, as shown in detail in Figure 4, annular channels 12. Radiating from the hub is a plurality of tubular spokes 13 provided at their inner ends with flattened terminals 14 which, as shown in Figure 3, are inserted in the slots 11 of the hub and are upset at their side edges to form locking ribs 15 lying within the channels 12. Initially, the terminals of the spokes are of a width to project at the side faces of the hub so that the side edges of the terminals may thus be readily hammered for compressing the terminals within the slots 11 as well as producing the locking ribs 15. In thus upsetting the projecting margins of the spoke terminals 14 in the channels 12 of the hub, said terminals are caused to bind in the slots 11 for tightly securing the spokes against radial movement while the ribs 15 will, of course, rigidly lock the spokes against lateral displacement. At the periphery of the hub, the spokes are, as best shown in Figure 2, bent laterally in the direction of the outer end of the hub, so that the wheel is thus dished and surrounding the spokes is a channel-shaped felly having inner and outer side walls 16 and 17 connected by a bottom wall 18. Near the inner side wall 16 of the felly, the bottom wall 18 thereof is provided with openings while the spokes 13 are turned at their outer ends to form tenons 19 extending through said openings. In thus turning the outer ends of the spokes, annular shoulders 20 are produced at the base ends of the tenons to abut the outer face of the bottom wall 18 of the felly and after the tenons have been inserted through the felly said tenons are spun down against the felly for tightly securing the felly to the spokes. The felly is thus rigidly mounted and, in this connection, particular attention is directed to the fact that the felly is displaced laterally in the direction of the outer end of the hub with respect to the outer ends of the spokes. Formed on the side wall 16 of the felly is an inclined flange 21 and formed on the side wall 17 is an inturned flange 22. The flanges 21 and 22 are adapted to support a rim, as conventionally illustrated at 23 and are provided with openings to accommodate bolts 24 carrying clamps 25 removably securing the rim in position. A conventional balloon tire 26 is shown in conjunction with the rim.

Bolted or otherwise secured to the hub 10 at its inner end to lie at the inner side of the wheel is a conventional brake drum 27 and surrounding the drum is the usual brake band 28 with which is associated the customary operating lever 29 which may be rocked for clamping the band about the drum. As particularly shown in Figure 2, the lever 29 lies very close to the periphery of the wheel but by dishing the wheel and mounting the felly upon the spokes in the manner shown, ample clearance is provided between said lever and felly as well as between the lever and the rim 23 so that at no time will the felly or rim strike the lever, the brake band, or associated parts, or otherwise interfere with the proper functioning thereof.

Having thus described the invention, what I claim is:

1. In combination, a wheel hub, a brake drum mounted at the inner end thereof, spokes radiating from the hub, and a felly secured to the spokes, the spokes being inclined in a direction away from the drum and the felly being offset with respect to the outer ends of the spokes in the same direction whereby to provide abnormal lateral displacement between the felly and the periphery of the drum.

2. In combination, a wheel hub, spokes radiating therefrom, a felly secured to the spokes, a brake drum mounted at the inner end of the hub, and a brake band surrounding the drum and provided with an operating lever, the spokes being inclined in a direction away from the drum and the felly being offset with respect to the outer ends of the spokes in the same direction whereby to provide clearance between said lever and the felly.

In testimony whereof I affix my signature.

FREDERICK L. MINNICK. [L. S.]